United States Patent
Higgins et al.

(10) Patent No.: US 7,099,845 B2
(45) Date of Patent: Aug. 29, 2006

(54) ELECTRONIC CHECK PRESENTMENT WITH IMAGE INTERCHANGE SYSTEM AND METHOD OF OPERATING AN ELECTRONIC CHECK PRESENTMENT WITH IMAGE INTERCHANGE SYSTEM

(75) Inventors: Raymond L. Higgins, Kitchener (CA); Wayne M. Doran, Kitchener (CA)

(73) Assignee: NCR Corporation, Dayton, OH (US)

( * ) Notice: Subject to any disclaimer, the term of this patent is extended or adjusted under 35 U.S.C. 154(b) by 717 days.

(21) Appl. No.: 09/930,907

(22) Filed: Aug. 16, 2001

(65) Prior Publication Data

US 2003/0037002 A1 Feb. 20, 2003

(51) Int. Cl.
*G06Q 40/00* (2006.01)

(52) U.S. Cl. .......................... 705/45; 705/35
(58) Field of Classification Search .................. 705/35, 705/45

See application file for complete search history.

(56) References Cited

U.S. PATENT DOCUMENTS

| | | | |
|---|---|---|---|
| 4,903,229 A * | 2/1990 | Schmidt et al. | 707/200 |
| 5,146,548 A * | 9/1992 | Bijnagte | 358/1.18 |
| 5,237,159 A | 8/1993 | Stephens et al. | |
| 5,691,524 A | 11/1997 | Josephson | |
| 5,717,868 A | 2/1998 | James | |
| 5,781,654 A * | 7/1998 | Carney | 382/137 |
| 5,930,778 A | 7/1999 | Geer | |
| 6,181,837 B1 | 1/2001 | Cahill et al. | |
| 6,661,910 B1 * | 12/2003 | Jones et al. | 382/135 |
| 2003/0208421 A1 * | 11/2003 | Vicknair et al. | 705/35 |

FOREIGN PATENT DOCUMENTS

WO       WO 97/22060       6/1997

* cited by examiner

*Primary Examiner*—Alain L. Bashore
(74) *Attorney, Agent, or Firm*—Michael Chan

(57) ABSTRACT

A method of operating an electronic check presentment with image interchange system comprises the steps of creating a number of electronic bundle files based upon captured MICR data associated with items, processing cash letter files and captured image data associated with the items to create a first temporary list, processing the cash letter files and the electronic bundle files to create a second temporary list, and merging the first and second temporary lists to create a merged list for creating an image presentment file. An image presentment file is created in a predefined format structure suitable for sending from a sending bank to a receiving bank based upon the merged list.

8 Claims, 12 Drawing Sheets

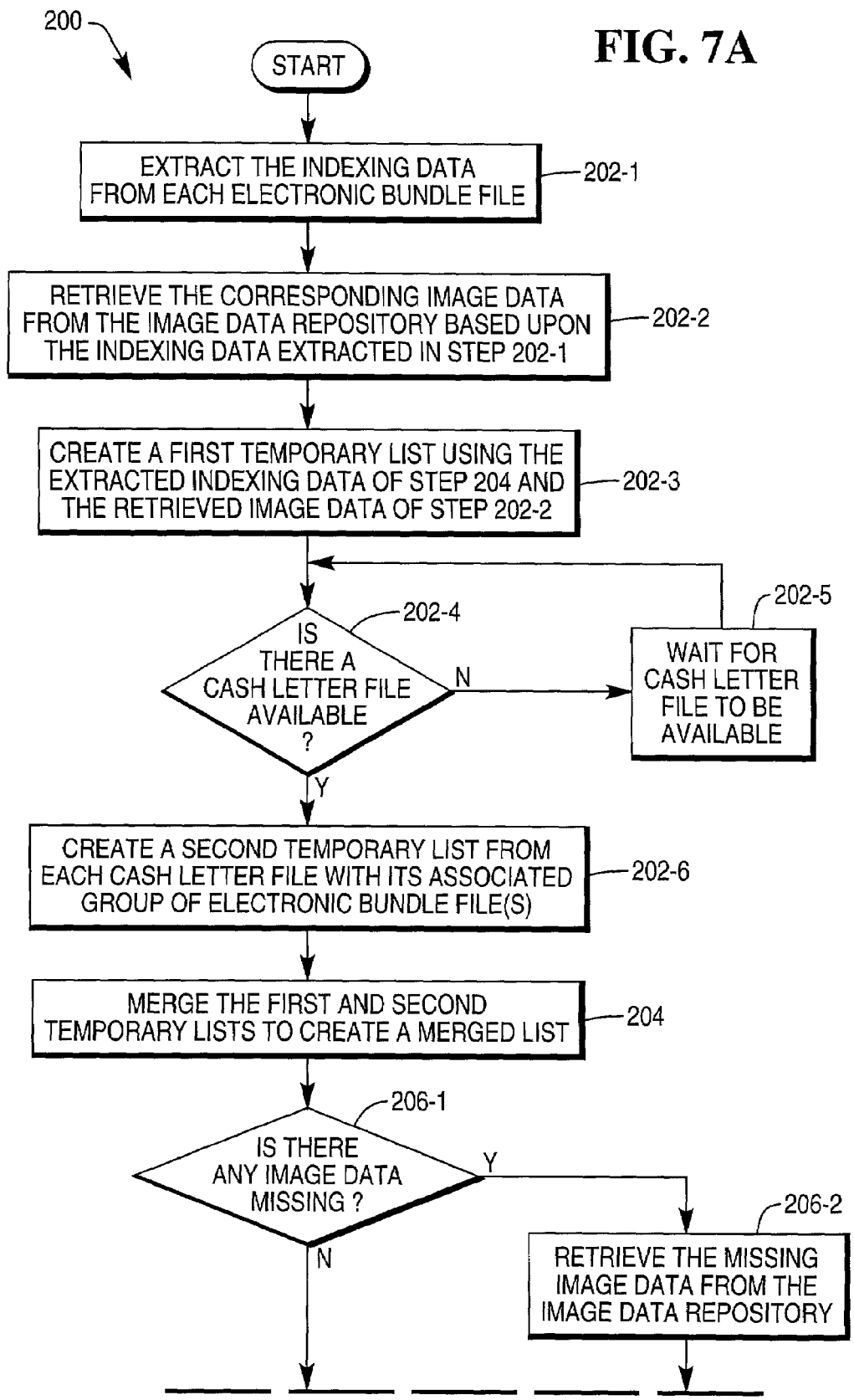

FIG. 9

| BOFD BUSINESS DATE | BOFD SEQUENCE NUMBER | BOFD | CLEARING SESSION NUMBER | CHECK DETAILS (MINUS INDEXING DATA) | BUNDLE ID | CASH LETTER ID |
|---|---|---|---|---|---|---|
| BOFD BUSINESS DATE | BOFD SEQUENCE NUMBER | BOFD | CLEARING SESSION NUMBER | CHECK DETAILS (MINUS INDEXING DATA) | BUNDLE ID | CASH LETTER ID |
| BOFD BUSINESS DATE | BOFD SEQUENCE NUMBER | BOFD | CLEARING SESSION NUMBER | CHECK DETAILS (MINUS INDEXING DATA) | BUNDLE ID | CASH LETTER ID |

~50

ELECTRONIC CHECK PRESENTMENT WITH IMAGE INTERCHANGE SYSTEM AND METHOD OF OPERATING AN ELECTRONIC CHECK PRESENTMENT WITH IMAGE INTERCHANGE SYSTEM

BACKGROUND OF THE INVENTION

The present invention relates to electronic check presentment, and is particularly directed to an electronic check presentment with image interchange system and a method of operating an electronic check presentment with image interchange system.

Electronic check presentment (ECP) systems are known. One type of ECP system is disclosed in U.S. Pat. No. 5,237,159 in which one bank (i.e., a sending bank) captures MICR data from checks, generates cash letters based upon the captured MICR data, and electronically transfers check information including the captured MICR data and the generated cash letters to other banks (i.e., receiving banks). More specifically, the sending bank electronically transfers a cash letter and the MICR data associated with that cash letter to a respective receiving bank. The sending bank also sends the physical cash letter and the physical checks associated with that physical cash letter to the respective receiving bank. The receiving bank stores the electronic MICR data into a database and reconciles the electronic cash letter against the physical paper cash letter when the physical cash letter arrives from the sending bank. The type of ECP system disclosed in U.S. Pat. No. 5,237,159 may be described as an ECP with physical checks following system.

Another type of ECP system is an ECP with images following system. In an ECP with images following system, the sending bank also electronically transfers an image presentation file along with the check information including the captured MICR data and the generated cash letter to the respective receiving bank. The image presentation file includes check images which were earlier captured at the sending bank. The check images sent to the respective receiving bank correspond to the MICR data and the cash letter electronically transferred to that respective receiving bank.

Still another type of ECP system is ECP with images on request. In an ECP with images on request system, the sending bank electronically transfers the check information including the captured MICR data and the generated cash letter to the respective receiving bank. After the receiving bank reviews the electronic check information, the receiving bank requests images of only certain checks from the sending bank. The sending bank then sends to the receiving bank only those images of checks requested by the receiving bank.

The ECP with images following system and the ECP with images on request system may be more generically categorized as ECP with image interchange systems. It should be apparent that an ECP with image interchange system has a number of advantages over an ECP with checks following system. One advantage of an ECP with image interchange system is that physical checks may be truncated at the sending bank. Accordingly, physical checks are not transported from the sending bank to the receiving bank. Although an ECP with image interchange system has a number of advantages over an ECP with checks following system, no ECP with image interchange system is known to be installed or in operation today.

SUMMARY OF THE INVENTION

In accordance with one aspect of the present invention, a method of operating an electronic check presentment with image interchange system comprises the steps of creating a number of electronic bundle files based upon captured MICR data associated with items, processing cash letter files and captured image data associated with the items to create a first temporary list, processing the cash letter files and the electronic bundle files to create a second temporary list, and merging the first and second temporary lists to create a merged list for creating an image presentment file.

In accordance with another aspect of the present invention, an electronic check presentment with image interchange system comprises means for creating a number of electronic bundle files based upon captured MICR data associated with items, means for processing cash letter files and captured image data associated with the items to create a first temporary list, means for processing the cash letter files and the electronic bundle files to create a second temporary list, and means for merging the first and second temporary lists to create a merged list for creating an image presentment file.

An image presentment file is created in a predefined format structure suitable for sending from a sending bank to a receiving bank based upon the merged list. The captured image data is stored in an image data repository. Any image data which is missing from the merged list is retrieved from the image repository. Indexing data based upon the captured MICR data is generated. The captured MICR data and the generated indexing data are stored in a MICR data repository. The corresponding MICR data and the corresponding indexing data for each physical bundle of items are retrieved from the MICR data repository. An electronic bundle file is created based upon the retrieved indexing data and the retrieved MICR data.

In accordance with still another aspect of the present invention, a method of creating an electronic bundle file for use in an electronic check presentment with image interchange system comprises the steps of retrieving from a MICR data repository captured MICR data which corresponds to a physical bundle of items, retrieving from the MICR data repository generated indexing data which corresponds to the physical bundle of items, and creating the electronic bundle file based upon the retrieved MICR data and the retrieved indexing data.

In accordance with yet another aspect of the present invention, an electronic bundle file for use in an electronic check presentment with image interchange system comprises a file header record including a number of data fields having data which is representative of characteristics of a cash letter file associated with a physical bundle of items, a bundle header record including a number of data fields having data which is representative characteristics of the electronic bundle file, and number of item detail records including a number of data fields having data which is representative of characteristics of items contained in the physical bundle of items. The data contained in the data fields of the file header record may comprise cash letter type and cash letter ID. The data contained in the data fields of the bundle header record may comprise bundle type and bundle ID.

In accordance with still another aspect of the present invention, a program storage medium is readable by a computer having a memory. The medium tangibly embodies one or more programs of instructions executable by the computer to perform method steps for creating an electronic bundle file for use in an electronic check presentment with image interchange system. The method comprises the steps of retrieving from a MICR data repository captured MICR data which corresponds to a physical bundle of items, retrieving from the MICR data repository generated indexing data which corresponds to the physical bundle of items, and creating the electronic bundle file based upon the retrieved MICR data and the retrieved indexing data.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 9 is a schematic view of a second temporary list which is created in the system of FIG. 1;

DETAILS OF THE INVENTION

The present invention is directed to an electronic check presentment with image interchange system and a method of operating an electronic check presentment with image interchange system.

Figure 1:
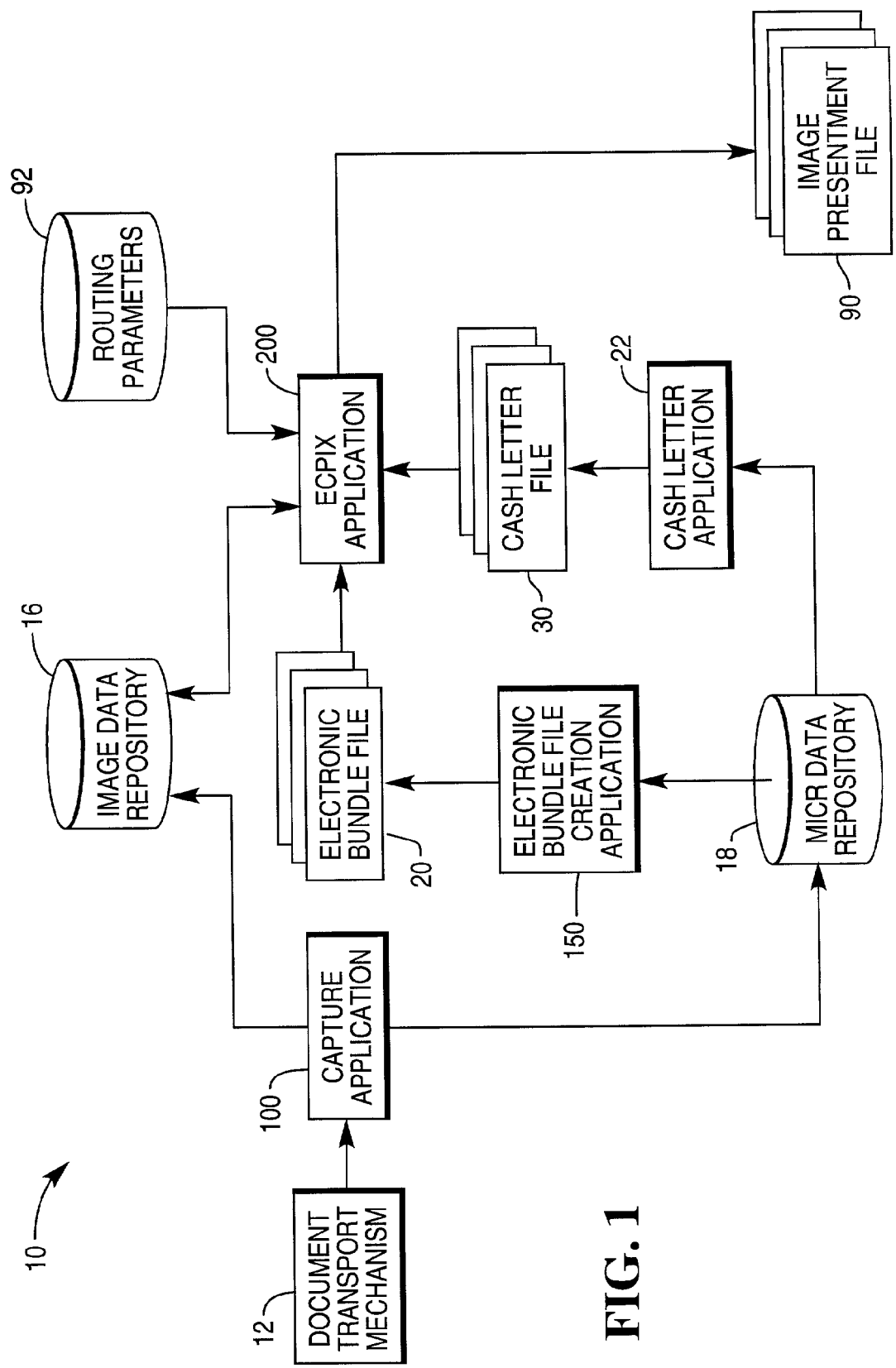
FIG. 1 is a schematic block diagram of an electronic check presentment with image interchange system in accordance with the present invention.

An electronic check presentment with image interchange system 10 (referred to herein as "ECPIX system 10") is illustrated in FIG. 1. The ECPIX system 10 includes a document transport mechanism 12 which transports physical checks (not shown) to a capture application 100. The mechanism 12 is located at a sending bank which is also known as the "collecting bank" in the ECPIX system 10.

Figure 2:
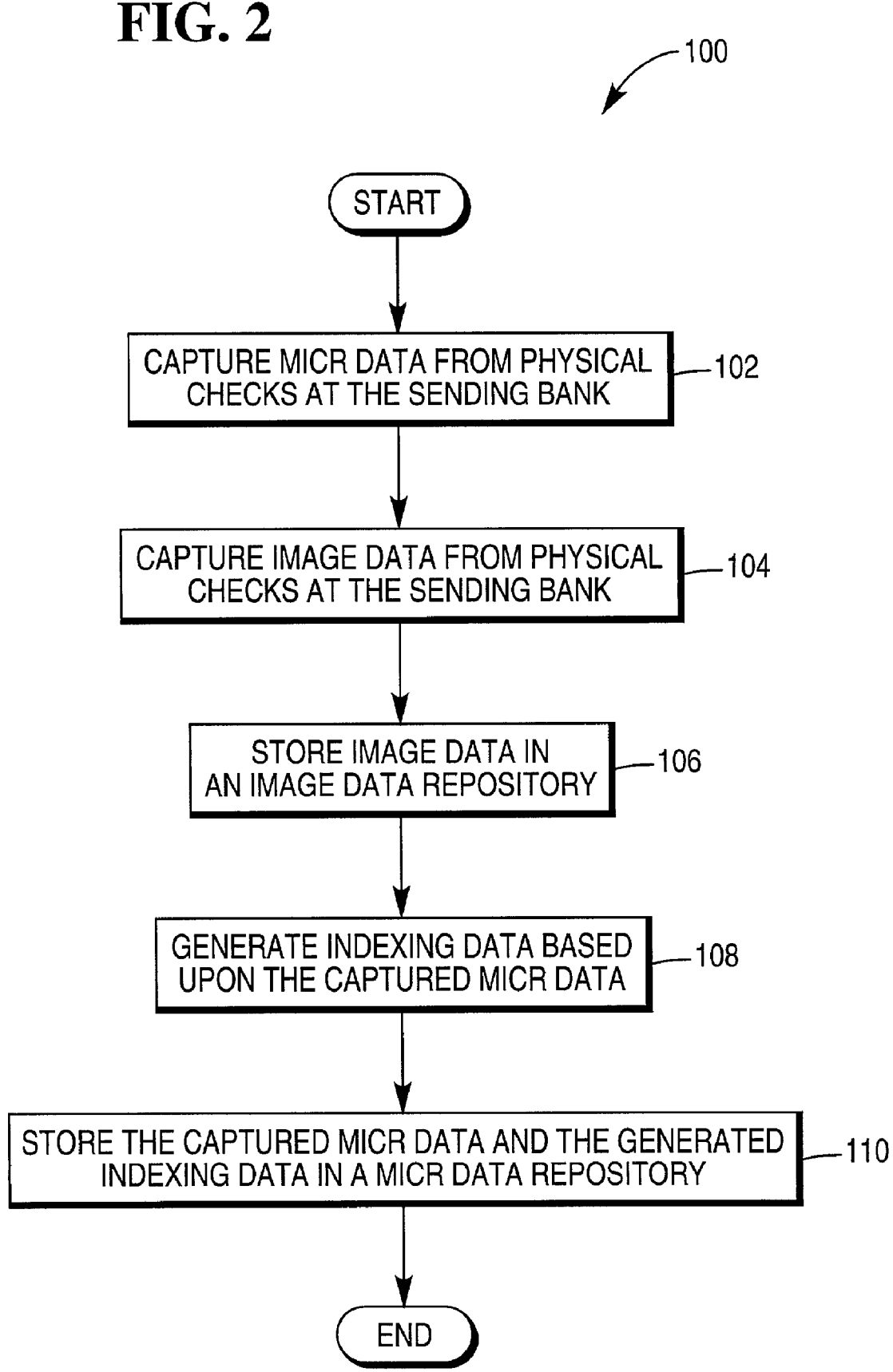
FIG. 2 is a flowchart depicting operation of a capture application which is used in the system of FIG. 1.

Referring to FIG. 2, a flowchart 100 depicts operation of the capture application 100. As shown in step 102, the sending bank captures MICR data from each of the physical checks transported from the mechanism 12. Also, as shown in step 104, the sending bank captures image data from each of the physical checks transported from the mechanism 12. In step 106, the captured image data from step 104 is stored in an image data depository 16, as shown in FIG. 1. The process of capturing MICR data and the process of capturing image data from checks are well known and, therefore, will not be described. In step 108, indexing data is generated based upon the captured MICR data from step 102. Then, as shown in step 110, the captured MICR data from step 102 and the generated indexing data from step 108 are stored in a MICR data repository 18, as shown in FIG. 1.

Figure 3:
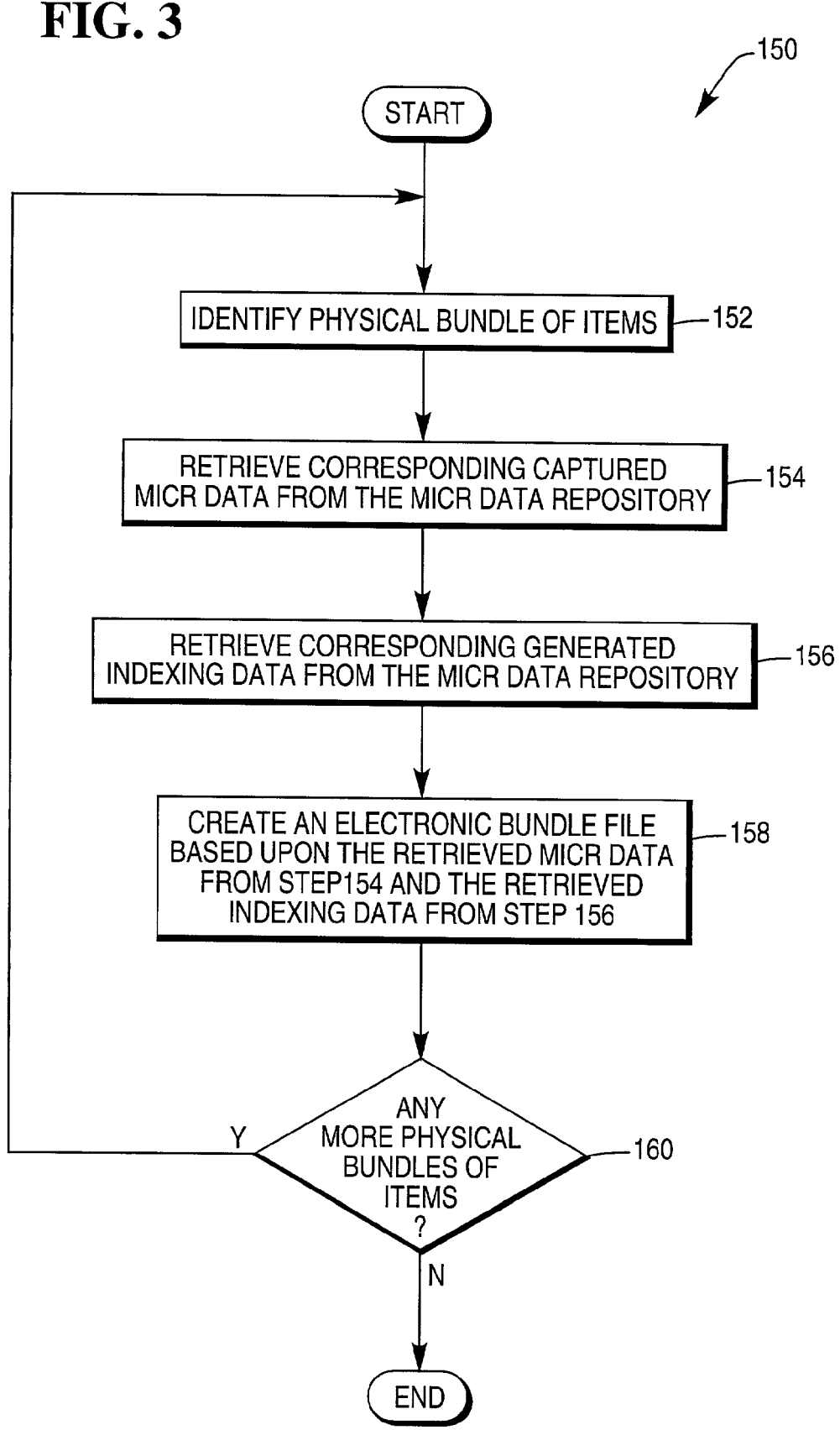
FIG. 3 is a flowchart depicting operation of an electronic bundle file creation application which is used in the system of FIG. 1.

Referring to FIG. 3, a flowchart 150 depicts operation of an electronic bundle file creation application 150 which creates an electronic bundle file 20, such as shown in FIG. 1, based upon data contained in the MICR data repository 18. More specifically, as shown in step 152 of FIG. 3, a physical bundle of items (i.e., checks) is identified. Then, in step 154, captured MICR data which corresponds to the physical bundle of items identified in step 152 is retrieved from the MICR data repository 18. Similarly, in step 156, generated indexing data which corresponds to the physical bundle of items identified in step 152 is also retrieved from the MICR data repository 18. The program proceeds to step 158.

In step 158, the electronic bundle file 20 is created based upon the MICR data which was retrieved in step 154 and the indexing data which was retrieved in step 156. The program proceeds to step 160 in which a determination is made as to whether there are any more physical bundles of items to consider for creating a corresponding electronic bundle file. If the determination in step 160 is affirmative, the program loops back to 152 to identify the next physical bundle of items to create a corresponding electronic bundle file. However, if the determination in step 160 is negative, the program terminates. Accordingly, each physical bundle of items has a corresponding electronic bundle file associated therewith.

Figure 4:
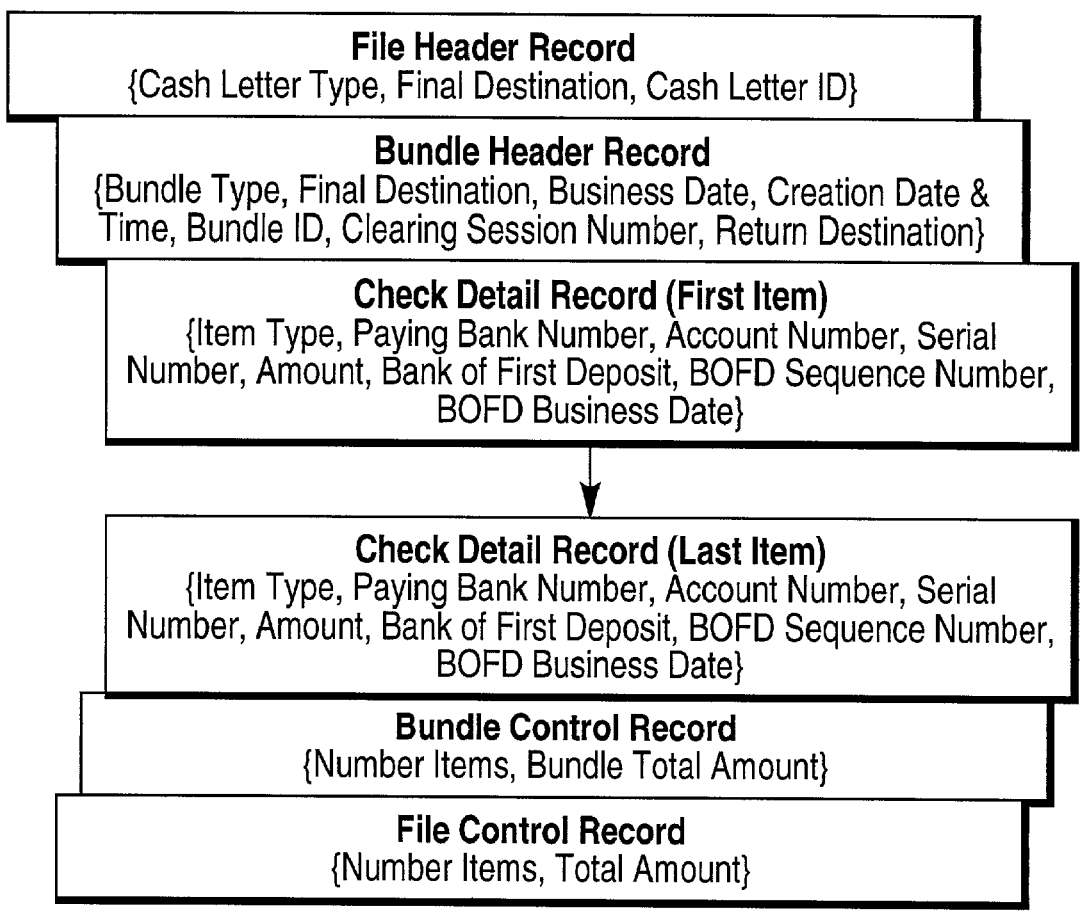
FIG. 4 is a schematic view of an electronic bundle file used in the system of FIG. 1.

A typical format of the electronic bundle file 20 is shown in FIG. 4. The electronic bundle file 20 of FIG. 4 comprises a number of records including: a file header record having data fields of cash letter type, final destination, and cash letter ID; a bundle header record having data fields of bundle type, final destination, business date, creation date & time, bundle ID, clearing session number, and return destination; a number of check detail records corresponding to the number of physical check items; a bundle control record having data fields of number of items, and bundle total amount; and a file control record having data fields of number of items, and total amount. Each check detail record has data fields of item type, paying bank number, account number, serial number, amount, bank of first deposit (BOFD), BOFD sequence number, and BOFD business date.

Referring again to FIG. 1, a cash letter application 22 also retrieves captured MICR data and generated indexing data from the MICR data repository 18 to create a cash letter file 30. The cash letter application 22 and its process of generating the cash letter file 30 from data stored in the MICR data repository 18 are well known in the art and, therefore, will not be described.

Figure 5:
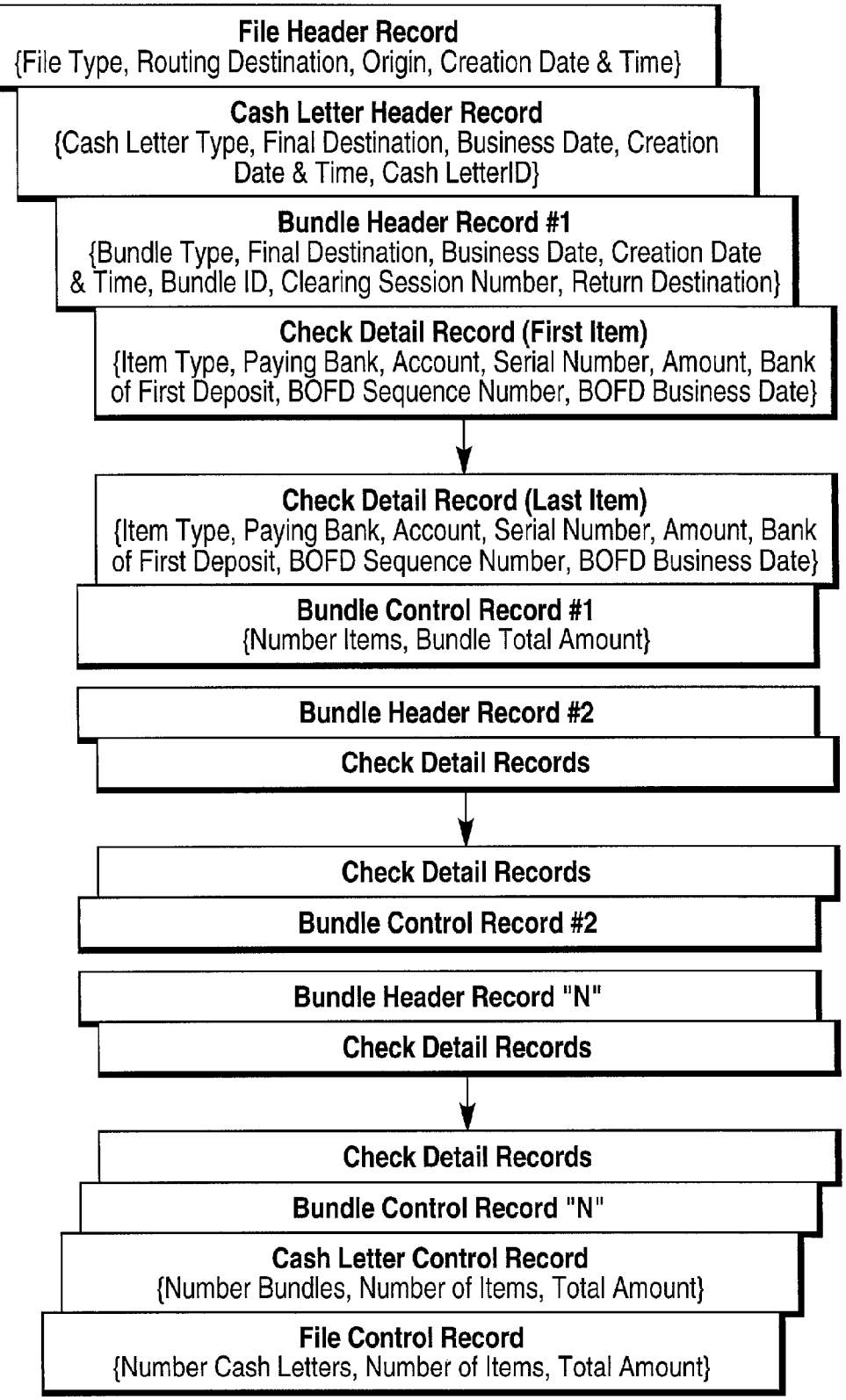
FIG. 5 is a schematic view of a cash letter file used in the system of FIG. 1.

A typical format of the cash letter file 30 is shown in FIG. 5. The cash letter file 30 of FIG. 5 comprises a number of records including: a file header record having data fields of file type, routing destination, origin, and creation date & time; a cash letter header record having data fields of cash letter type, final destination, business date, creation date & time, and cash letter ID; a number of bundle header records corresponding to the number physical bundles of items; a number of check detail records corresponding to the number of physical check items within a particular bundle; a number of bundle control records corresponding to also the number of physical bundles of items; a cash letter control record having data fields of number of bundles, number of items, and total amount; and a file control record having data fields of number of cash letters, number of items, and total amount.

Each bundle header record has data fields of bundle type, final destination business date, creation date & time, bundle ID, clearing session number, and return destination. Each check detail record has data fields of item type, paying bank number, account number, serial number, amount, bank of first deposit (BOFD), BOFD sequence number, and BOFD business date. Cash letter files and their data structures are well known and, therefore, will not be described.

Figure 6:
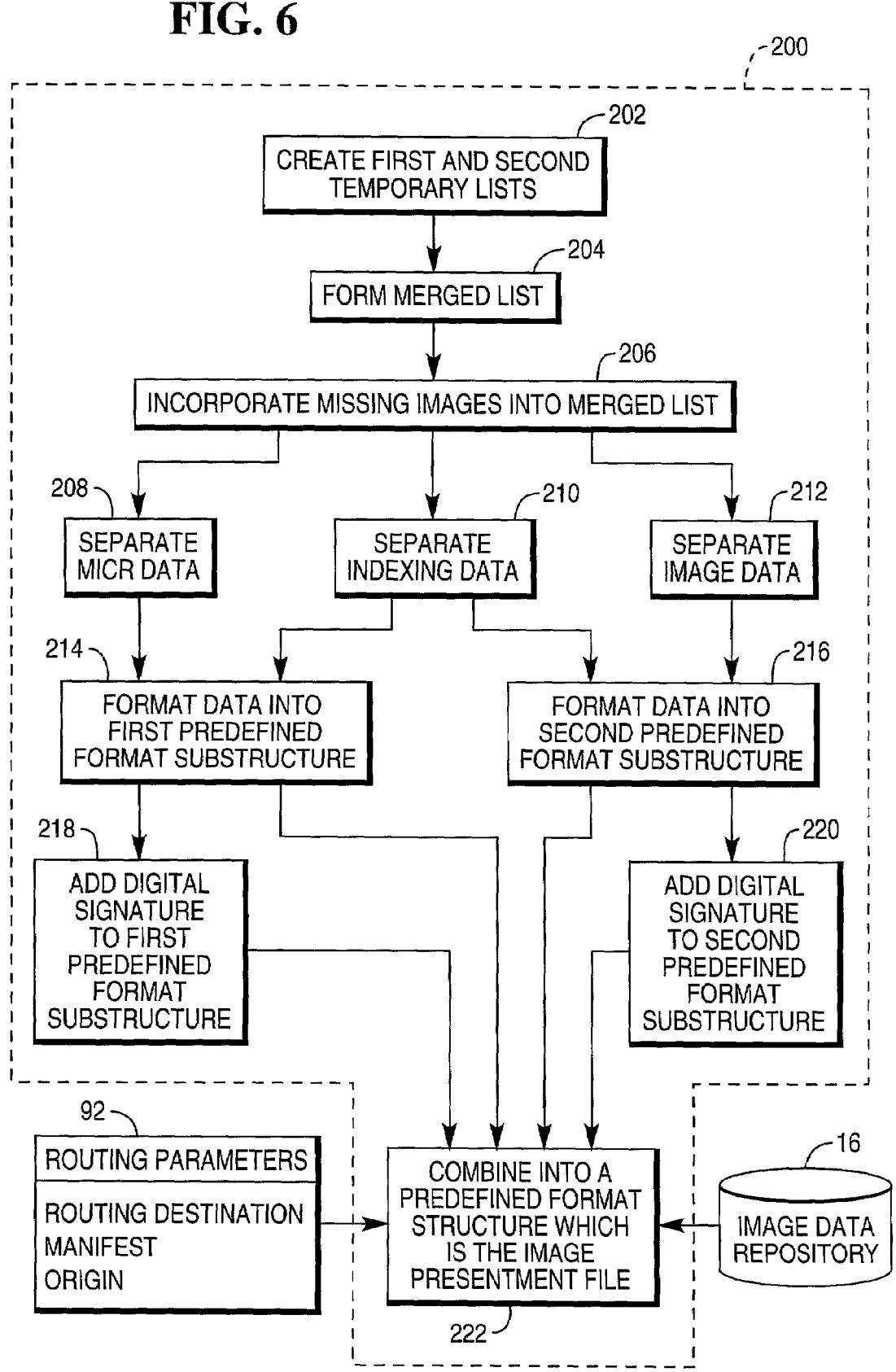
FIG. 6 is an overview flowchart depicting operation of an electronic check presentment with image interchange application which is used in the system of FIG. 1.
Figure 7B:
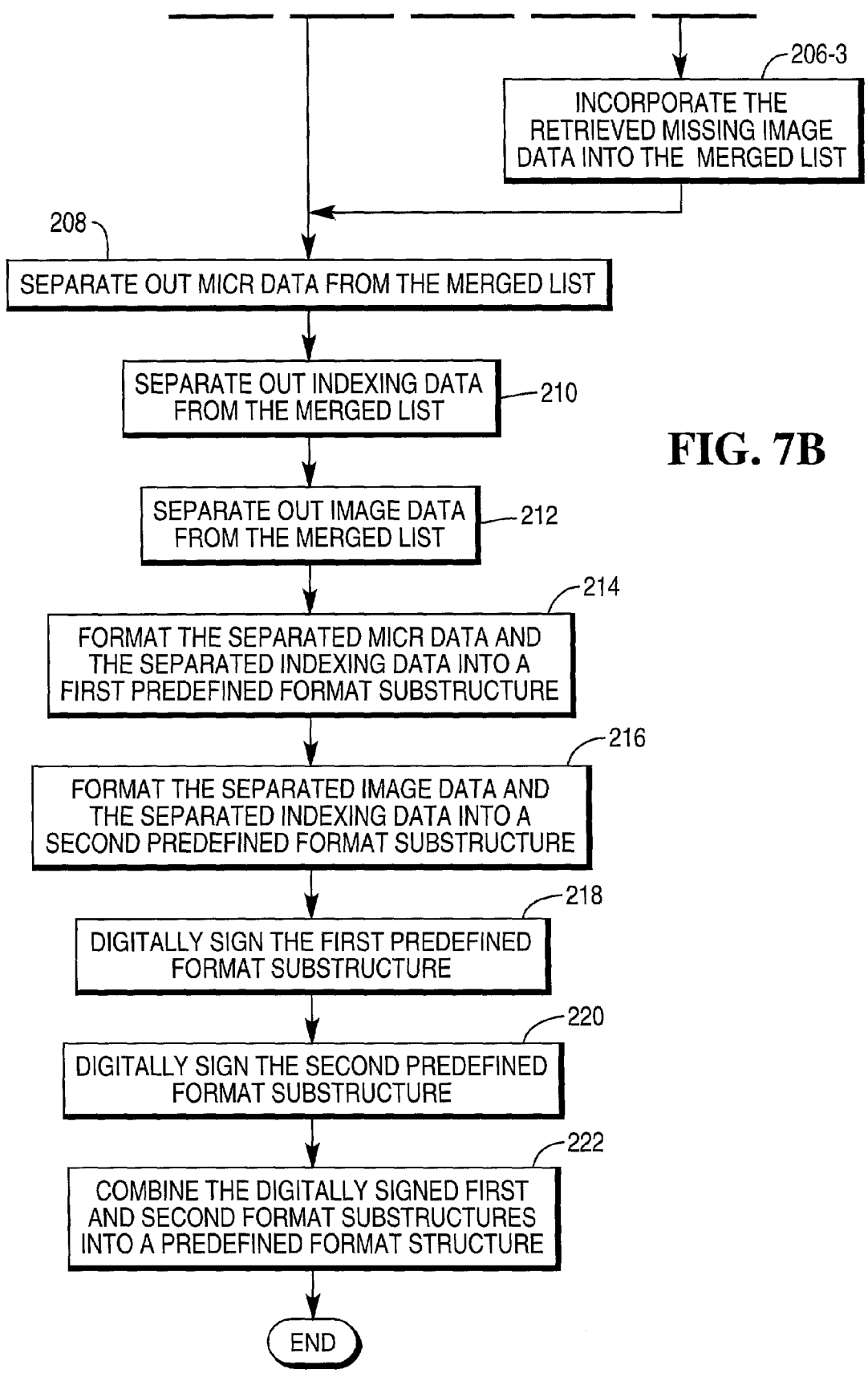
FIG. 7 is a more detailed flowchart of the overview flowchart of FIG. 6.

Referring now to FIGS. 1, 6, and 7, an ECPIX application 200 processes data from the cash letter file 30, the electronic bundle file 20, and the image data repository 16 to generate an image presentment file 90, as shown in FIG. 1 FIG. 6 is a an overview flow diagram which depicts operation of the ECPIX application 200. FIG. 7 is a detailed flowchart which depicts operation of the ECPIX application 200. It should be noted that step 202 shown in FIG. 6 includes steps 202-1, 202-2, 202-3, 202-4, 202-5, and 202-6 in FIG. 7. It should also be noted that step 206 in FIG. 6 includes steps 206-1, 206-2, and 206-3 shown in FIG. 7.

Figure 8:
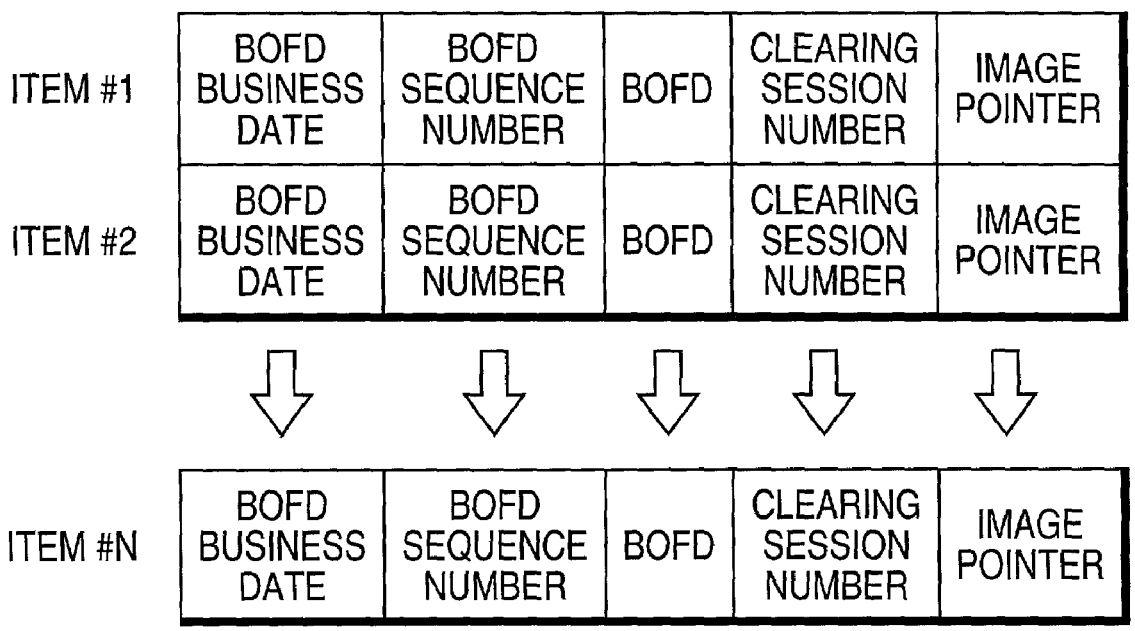
FIG. 8 is a schematic view of a first temporary list which is created in the system of FIG. 1.

As shown in FIG. 6, first and second temporary lists 40, 50 (such as shown in FIGS. 8 and 9, respectively) are created as shown in step 202. More specifically, as shown in FIG. 7, the first and second temporary lists 40, 50 of FIGS. 8 and 9, respectively, are created in steps 202-1 through 202-6. In step 202-1 of FIG. 7, the indexing data from the electronic bundle file 20 is extracted. Then in step 202-2, corresponding image data is retrieved from the image data repository 16 based upon the indexing data extracted in step 202-1. In step 202-3, by using the extracted indexing data from step 202-1 and the corresponding retrieved image data from step 202-2, the first temporary list 40 of FIG. 8 is created.

The first temporary list 40 of FIG. 8 represents items and data associated with the items. The data associated with each item is contained in a number of data fields including BOFD date, BOFD sequence number, BOFD, clearing session number, and an image pointer which points to corresponding image data (i.e., image data corresponding to that particular item) stored in the image data repository 16. The program then proceeds to step 202-4 of FIG. 7.

In step 202-4, a determination is made as to whether a cash letter file (such as the one shown in FIG. 5) is available. If the determination in step 202-4 is negative, the program proceeds to step 202-5 and waits for a cash letter file to be available. If the determination in step 202-4 is affirmative (i.e., a cash letter file is or has become available), the program proceeds to step 202-6. In step 202-6, the second temporary list 50 of FIG. 9 is created.

The second temporary list 50 of FIG. 9 is created from each cash letter file (such as shown in FIG. 5) and its associated group of electronic bundle file(s) (such as shown in FIG. 4). The second temporary list 50 of FIG. 9 represents items and data associated with the items. The data associated with each item is contained in a number of data fields including BOFD business date, BOFD sequence number, BOFD, clearing session number, check details excluding indexing data, bundle ID, and cash letter ID. The program then proceeds to step 202-4 of FIG. 7. The program then proceeds to step 204 as shown in FIGS. 6 and 7.

Figure 10:
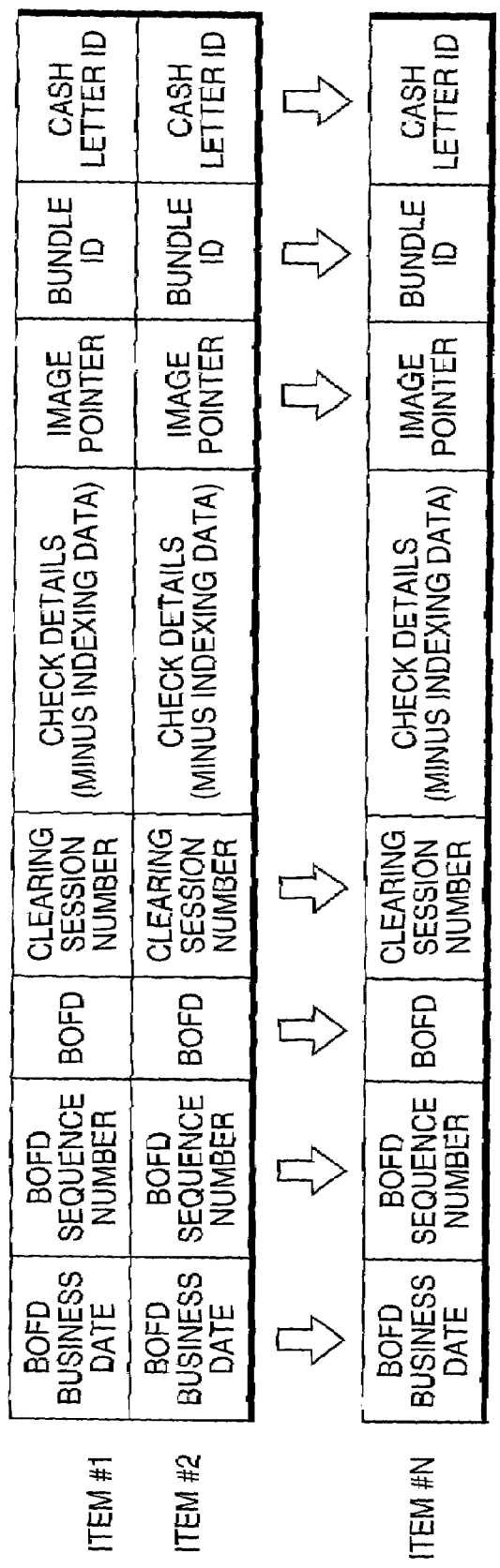
FIG. 10 is a schematic view of a merged list which is created from the first temporary list of FIG. 8 and the second temporary list of FIG. 9.

In step 204, the first temporary list 40 of FIG. 8 and the second temporary list 50 of FIG. 9 are merged together to form a merged list 60 as shown in FIG. 10. The merged list 60 of FIG. 10 represents items and data associated with the items. The data associated with each item is contained in a number of data fields including BOFD business date, BOFD sequence number, BOFD, clearing session number, check details minus indexing data, an image pointer which points to corresponding image data (i.e., image data corresponding to that particular item) stored in the image data repository 16, bundle ID, and cash letter ID.

As shown in the merged list 60 of FIG. 10, the indexing data for each item includes the data fields of BOFD business date, BOFD sequence number, BOFD, and clearing session number. The MICR data for each item includes the data field of check details minus indexing data. The image data for each item includes the data field of the image pointer which points to image data corresponding to that particular item.

The program then proceeds to step 206 of FIG. 6 which includes steps 206-1 through 206-3 of FIG. 7. In step 206-1, a determination is made as to whether there is any image data which is missing from the merged list 60 of FIG. 10. If the determination in step 206-1 is negative, the program proceeds directly to step 208 of FIGS. 6 and 7. However, if the determination in step 206-1 is affirmative, the program proceeds to step 206-2 in which missing image data is retrieved from the image data repository 16. Then in step 206-3, the retrieved missing image data is incorporated into the merged list 60 of FIG. 10 before proceeding to step 208 of FIGS. 6 and 7.

In step 208, the MICR data is separated out from the merged list 60 of FIG. 10. Similarly, the indexing data is separated out from the merged list 60, as shown in step 210. Also, the image data is separated out from the merged list 60, as shown in step 212. The program then proceeds to step 214 of FIGS. 6 and 7.

Figure 11:
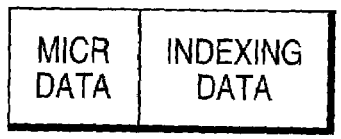
FIG. 11 is a schematic view of a first predefined format structure which contains data from the merged list of FIG. 10.

In step 214, the separated MICR data from step 208 and the separated indexing data from step 210 are formatted into a first predefined format substructure 70 such as generally shown in FIG. 11. The first predefined format substructure 70 comprises a structure in accordance with ANSI X.9.37, for example. Although the above describes the first predefined format substructure 70 as comprising a structure in accordance with ANSI X9.37, it is contemplated that a structure in accordance with a different standard could have been used.

Figure 12:
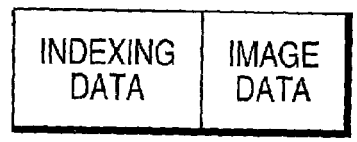
FIG. 12 is a schematic view of a second predefined format structure which contains data from the merged list of FIG. 10.

Similarly, the separated image data from step 212 and the separated indexing data from step 210 are formatted into a second predefined format substructure 80 such as generally shown in FIG. 12. The second predefined format substructure 80 comprises a structure in accordance with a subpart of ANSI X9.46, for example. Although the above describes the second redefined format substructure 80 as comprising a structure in accordance with a subpart of ANSI X9.46, it is contemplated that a structure in accordance with a different standard could have been used.

Figure 13:
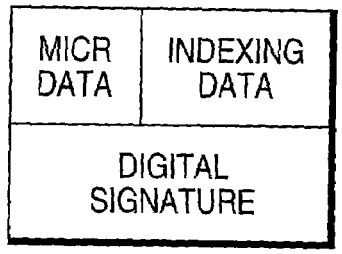
FIG. 13 is a schematic view of the first predefined format structure FIG. 11 which contains a digital signature.
Figure 14:
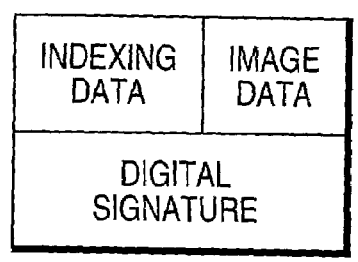
FIG. 14 is a schematic view of the second predefined format structure FIG. 12 which contains a digital signature.

The first predefined format substructure 70 of FIG. 11 is digitally signed in a known manner as shown in step 218 to provide a first digitally signed predefined substructure 72 as shown in FIG. 13. Similarly, the second predefined format substructure 80 of FIG. 12 is digitally signed in a known manner as shown in step 220 to provide a second digitally signed predefined substructure 82 as shown in FIG. 14. The program then proceeds to step 222.

Figure 15:
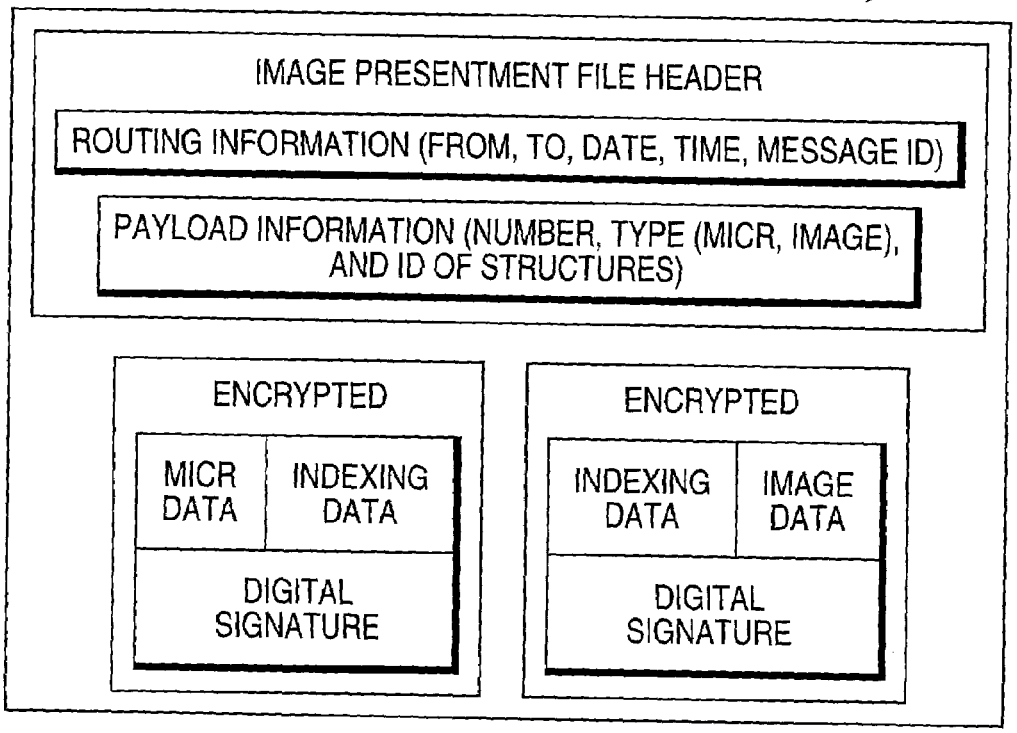
FIG. 15 is a schematic view of an image presentation file which is created from the first digitally signed predefined structure of FIG. 13 and the second digitally signed predefined structure of FIG. 14.

In step 222, the first digitally signed format substructure 72 of FIG. 13 and the second digitally signed format substructure 82 of FIG. 14 are combined into a predefined format structure 90, such as shown in FIG. 15. The predefined format structure 90 of FIG. 15 is representative of an image presentment file which is in a format suitable to be sent from the sending bank (i.e., the collecting bank) to a receiving bank (i.e., the paying bank). More specifically, the first digitally signed format substructure 72 of FIG. 13 and the second digitally signed format substructure 82 of FIG. 14 are combined into the predefined format structure 90 of FIG. 15 based upon image data retrieved from the image data repository 16 and a number of routing parameters 92 as shown in FIG. 6. The routing parameters 92 may include routing destination, manifest, and origin. The generation of routing parameters and their structure are well known and, therefore, will not be described.

The image presentment file 90 of FIG. 11 comprises a number of records including: an image presentment file header record which contains routing information and payload information. The routing information is contained in the data fields of from, to, date, time, and message ID. The payload information is contained in the data fields of number, type (MICR or image), and ID of structures. For each item, the image presentment file 90 comprises MICR data in the format of the first digitally signed predefined format substructure 72 of FIG. 13 and image data in the format of the second digitally signed predefined format substructure 82 of FIG. 14. As shown in FIG. 15, each of the first and second digitally signed predefined format substructures 72, 82 may be encrypted. The format of the image presentment file 90 is in accordance with ANSI X9.46, for example. Although the above describes the image presentment file 90 as comprising a structure in accordance with ANSI X9.46, it is contemplated that a structure in accordance with a different standard could have been used.

A number of advantages result by creating the image presentment file 90 of FIG. 15 in accordance with the process described hereinabove. One advantage is that the MICR data and the image data are presented together from the sending bank to the receiving bank. Accordingly, only one message format need be exchanged between the banks.

A number of advantages result by providing the merged list 60 of FIG. 10 during the process of creating the image presentment file 90 of FIG. 15. One advantage is that a validating process occurs when the merged list 60 of FIG. 10 is created. The validating process occurs when the merged list 60 is created because item data from two sources (i.e., the electronic bundle file 20 of FIG. 4 and the cash letter file 30 of FIG. 5) is compared to ensure that item data is correct and that all items are accounted for. Any discrepancy (e.g., extra or missing items, missing or invalid image pointers, data fields that do not match of have missing data, etc.) which is identified during item data comparison may be researched and resolved. Moreover, the merged list 60 may be used to ensure that image data exists and is available for each item in the merged list 60. Accordingly, the merged list 60 may be considered as a "validated" file for use in subsequent processing.

A number of advantages result by providing the electronic bundle file creation application 150 of FIG. 3 to create the electronic bundle file 20 of FIG. 4 for each corresponding physical bundle of items during the process of creating the image presentment file 90 of FIG. 15. One advantage is that the ECPIX application 200 of FIGS. 6 and 7 is able to retrieve image indexing data from the electronic bundle file 20 and image data from the image data repository 16 to begin creation of the image presentment file 90 even before beginning creation of the corresponding cash letter file 30 of FIG. 5. It should be noted that, as is known, the cash letter file 30 cannot begin to be created until the capture application 100 of FIG. 2 has completed capturing data for the last item in the corresponding physical bundle of items. Accordingly, it should be apparent that the overall time needed for creating the image presentment file 90 is reduced when image data from the image data repository 16 is made available (via availability of the image indexing data from the electronic bundle file 20) to the ECPIX application 200 for processing before creation of the corresponding cash letter file 30. Thus, the sending bank is able to present the image presentment file 90 to the receiving bank much sooner, which reduces potential for fraud, reduces float, and reduces missed deadline events as defined by banking rules which apply to interbank clearing and settlement.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of operating an electronic check presentment with image interchange system, the method comprising the steps of:

creating a number of electronic bundle files based upon captured MICR data associated with items;

processing cash letter files and captured image data associated with the items to create a first temporary list;

processing the cash letter files and the electronic bundle files to create a second temporary list;

merging the first and second temporary lists to create a merged list for creating an image presentment file; and creating an image presentment file in a predefined format structure suitable for sending from a sending bank to a receiving bank based upon the merged list.

2. A method according to claim 1, further comprising the steps of:

storing the captured image data in an image data repository; and retrieving from the image repository any image data which is missing from the merged list.

3. A method according to claim 1, further comprising the step of:

generating indexing data based upon the captured MICR data; and storing the captured MICR data and the generated indexing data in a MICR data repository.

4. A method according to claim 3, further comprising the step of:

retrieving from the MICR data repository the corresponding MICR data and the corresponding indexing data for each physical bundle of items; and creating an electronic bundle file based upon the retrieved indexing data and the retrieved MICR data.

5. An electronic check presentment with image interchange system comprising:

means for creating a number of electronic bundle files based upon captured MICR data associated with items;

means for processing cash letter files and captured image data associated with the items to create a first temporary list;

means for processing the cash letter files and the electronic bundle files to create a second temporary list; and means for merging the first and second temporary lists to create a merged list for creating an image presentment file; and means for creating an image presentment file in a predefined format structure suitable for sending from a sending bank to a receiving bank based upon the merged list.

6. An electronic check presentment with image interchange system according to claim 5, further comprising means for storing the captured image data in an image data repository, and means for retrieving from the image repository any image data which is missing from the merged list.

7. An electronic check presentment with image interchange system according to claim 5, further comprising means for generating indexing data based upon the captured MICR data, and means for storing the captured MICR data and the generated indexing data in a MICR data repository.

8. An electronic check presentment with image interchange system according to claim 7, further comprising means for retrieving from the MICR data repository the corresponding MICR data and the corresponding indexing data for each physical bundle of items, and means for creating an electronic bundle file based upon the retrieved indexing data and the retrieved MICR data.

* * * * *